US009646082B2

(12) United States Patent
Al-Kofahi et al.

(10) Patent No.: US 9,646,082 B2
(45) Date of Patent: May 9, 2017

(54) SYSTEMS, METHODS, AND SOFTWARE FOR IDENTIFYING RELEVANT LEGAL DOCUMENTS

(75) Inventors: Khalid Al-Kofahi, Rosemount, MN (US); Michael Dahn, Farmington, MN (US); Patrick Slaven, Penfield, NY (US); Thomas Zielund, Shakopee, MN (US); Qiang Lu, Rochester, NY (US); Charles Elberti, Rochester, NY (US)

(73) Assignee: Thomson Reuters Global Resources, Baar (CH)

( * ) Notice: Subject to any disclaimer, the term of this patent is extended or adjusted under 35 U.S.C. 154(b) by 0 days.

(21) Appl. No.: 11/538,749

(22) Filed: Oct. 4, 2006

(65) Prior Publication Data

US 2008/0033929 A1 Feb. 7, 2008
US 2012/0323880 A9 Dec. 20, 2012

Related U.S. Application Data

(63) Continuation-in-part of application No. 11/028,476, filed on Jan. 3, 2005.
(Continued)

(51) Int. Cl.
*G06F 17/30* (2006.01)
*G06Q 50/18* (2012.01)

(52) U.S. Cl.
CPC .. *G06F 17/30722* (2013.01); *G06F 17/30011* (2013.01); *G06F 17/30864* (2013.01); *G06Q 50/18* (2013.01)

(58) Field of Classification Search
CPC ............... G06C 50/18; G06F 17/30864; G06F 17/30011; G06F 17/30722
(Continued)

(56) References Cited

U.S. PATENT DOCUMENTS 6,289,342 B1 * 9/2001 Lawrence et al.
6,502,081 B1 * 12/2002 Wiltshire et al. ............... 706/12
(Continued)

FOREIGN PATENT DOCUMENTS

| WO | WO-99/53418 A1 | 10/1999 | |
|---|---|---|---|
| WO | WO 2005/066849 | * 7/2005 | ............. G06F 17/30 |
| WO | WO-2007/041688 A1 | 4/2007 | |

OTHER PUBLICATIONS

Manual entitled "Using westlaw.com", Copyright 2000, by Gilbertson.*
(Continued)

*Primary Examiner* — Mahesh Dwivedi
(74) *Attorney, Agent, or Firm* — Duncan Galloway Egan Greenwald, PLLC; Kevin T. Duncan

(57) ABSTRACT

To facilitate legal research, companies, such as Thomson West provide subscription-based online information-retrieval systems. Seeking to improve these and/or related systems, the present inventors devised, among other things, an exemplary legal research system that performs a conventional search to identify a set of starter documents and then leverages the metadata associated with these starter documents to identify another larger set of relevant documents. Documents in this alternate set are then scored using, for example, a learning machine and feature vectors that account for metadata relationships between the starter documents and alternate documents.

43 Claims, 3 Drawing Sheets

Related U.S. Application Data

(60) Provisional application No. 60/723,322, filed on Oct. 4, 2005, provisional application No. 60/533,819, filed on Dec. 31, 2003.

(58) Field of Classification Search
USPC .................................. 707/5, 749, 942, 708
See application file for complete search history.

(56) References Cited

U.S. PATENT DOCUMENTS

| | | | |
|---|---|---|---|
| 6,601,075 B1* | 7/2003 | Huang et al. ................ | 707/748 |
| 6,738,678 B1 | 5/2004 | Bharat et al. | |
| 6,772,149 B1* | 8/2004 | Morelock et al. | |
| 8,032,506 B1* | 10/2011 | Gregov et al. ............... | 707/706 |
| 2002/0087532 A1* | 7/2002 | Barritz et al. .................... | 707/3 |
| 2002/0138529 A1* | 9/2002 | Yang-Stephens et al. .... | 707/530 |
| 2002/0156760 A1* | 10/2002 | Lawrence et al. ............... | 707/1 |
| 2003/0046277 A1* | 3/2003 | Jackson et al. .................. | 707/3 |
| 2003/0101181 A1* | 5/2003 | Al-Kofahi et al. ............... | 707/7 |
| 2003/0105682 A1* | 6/2003 | Dicker et al. .................... | 705/27 |
| 2003/0128212 A1* | 7/2003 | Pitkow ........................ | 345/440 |
| 2004/0024775 A1* | 2/2004 | Kemp ........................... | 707/102 |
| 2004/0093349 A1* | 5/2004 | Buinevicius et al. ..... | 707/104.1 |
| 2004/0215606 A1* | 10/2004 | Cossock ........................... | 707/3 |
| 2005/0149343 A1* | 7/2005 | Rhoads et al. .................... | 705/1 |
| 2005/0203899 A1* | 9/2005 | Anderson et al. ................ | 707/5 |
| 2005/0228788 A1* | 10/2005 | Dahn et al. ...................... | 707/3 |
| 2005/0278633 A1* | 12/2005 | Kemp ........................... | 715/713 |
| 2006/0041607 A1* | 2/2006 | Miller et al. .................. | 707/205 |
| 2006/0041608 A1* | 2/2006 | Miller et al. .................. | 707/205 |
| 2006/0287971 A1* | 12/2006 | Armstrong ........................ | 707/1 |

OTHER PUBLICATIONS

Article entitled "LexisNexis Total Search", by Lexis, Copyright 2003.*

Article entitled "ResultsPlus on Westlaw Gives Researchers More of What Ther're Looking for -Faster", by Westlaw, dated Jun. 30, 2003.*

Article entitled "ResultsPlus for Statutes Now Available on Westlaw", by Westlaw, dated Mar. 29, 2004.*

American Heritage College Dictionary Definition of Attribute & Document.*

"International Search Report for corresponding PCT Application No. PCT/US2006/039060", (Jan. 23, 2007), 4 pgs.

"Written Opinion of the International Searching Authority for corresponding PCT Application No. PCT/US2006/039060", (Jan. 23, 2007), 5 pgs.

Hane, P. J., "Thomson Announces New Pharma Research Tool", [online}. Nov. 29, 2004, Press Release Thompson Corp. Retrieved from the Internet: <http://www.infotoday.com/newsbreaks/nb041129-1.shtml>, 2 pgs.

* cited by examiner

Sources
- Dees v. Saban Entertainment
- Morrill v. Smashing Pumpkins

Jurisdiction: California

Issues:
- Implied Copyright License
- 99K48, 99K49, 99K75, 99K88, 99K107

Key Materials
- Key Cases
  - Effects Assoc. v. Cohen
  - Oddo v. Ries
  - Foad Consulting Group v. Azzalino
  - ...
  - A&M Records v. Napster
  - ...

- Key Statutes
  - 17 U.S.C §204: Execution of transfers of copyright ownership
  - 17 U.S.C §101: Definitions
- Key Briefs/Trial Docs
  - 2004 WL 2254503: Marder v Lopes & Sony Music: Appellees Brief
  - 200e WL 22724273: Blatty v Warner Bros: Appellee's Brief
  - ...
- Key Analytical Materials
  - 18 AmJur 2d Copyright & Intellectual Property § 155
  - 52 J. Copyright Soc't USA 403: Selected Law of Copyright Assignments and Licenses
  - ...

Additional Related Materials

FIGURE 3

SYSTEMS, METHODS, AND SOFTWARE FOR IDENTIFYING RELEVANT LEGAL DOCUMENTS

CROSS-REFERENCE TO RELATED APPLICATION

This application claims priority to U.S. provisional application 60/723,322 filed on Oct. 4, 2005. The provisional application 60/723,322 is incorporated herein by reference in its entirety. This application claims the benefit of priority as a continuation in part to U.S. patent application Ser. No. 11/028,476, filed on Jan. 3, 2005 entitled SYSTEMS, METHODS, INTERFACES AND SOFTWARE FOR EXTENDING SEARCH RESULTS BEYOND INTITIAL QUERY-DEFINED BOUNDARIES, which in turn claims priority to U.S. provisional application 60/533,819 filed Dec. 31, 2003.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005, West Services Inc.

TECHNICAL FIELD

Various embodiments of the present invention concern information-retrieval systems, such as those that provide legal documents or other related content.

BACKGROUND

The American legal system, as well as some other legal systems around the world, relies heavily on written judicial opinions, the written pronouncements of judges, to articulate or interpret the laws governing resolution of disputes. Each judicial opinion is not only important to resolving a particular legal dispute, but also to resolving similar disputes, or cases, in the future. Because of this, judges and lawyers within our legal system are continually researching an ever-expanding body of past opinions, or case law, for the ones most relevant to resolution of disputes.

To facilitate these searches West Publishing Company of St. Paul, Minn. (doing business as Thomson West) collects judicial opinions from courts across the United States, and makes them available electronically through its Westlaw™ legal research system. Users access the judicial opinions, for example, by submitting keyword queries for execution against a jurisdictional database of judicial opinions or case law. The Westlaw system also includes a ResultsPlus feature which suggest other content, particularly secondary legal content, such as legal encyclopedia articles, that are relevant to the specific case law queries. (See for example, US20050228788A1, which is incorporated herein by reference.)

At least one problem the present inventors recognized with this effective and highly successful system is that it does not fully appreciate the "one good case" methodology that many, if not most, legal researchers uses when conducting their research. This method generally entails a user running a relatively broad or intermediate query, manually identifying one highly relevant case law document from the search results, and then leveraging that good document to find other relevant documents.

Accordingly, the present inventors have recognized a need for improvement of information-retrieval systems for legal documents and potentially other document retrieval systems.

SUMMARY

To address this and/or other needs, the present inventors devised, among other things, systems, methods, and software that facilitate the retrieval of highly relevant legal documents in response to queries for legal opinions (case law documents). One exemplary system receives a user query for legal opinions and runs the query against a legal opinion database and on or more other non-legal opinion databases, such as a metadata store. The metadata includes legal classification codes, associated legal head notes, and related secondary legal documents, such as legal treatises, legal encyclopedias. Metadata based on these results is then used to identify a set of key classification codes and these in turn are used to identify highly relevant case law documents. These case law document can then be used to identify other relevant case law and/or non-case law documents based on citation relationships, text similarities, and so forth.

BRIEF DESCRIPTION OF DRAWINGS

FIG. 3 is a diagram of an exemplary user interface 300 corresponding to one or more embodiments of the invention.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Additionally, this document incorporates by reference U.S. Provisional Patent Application 60/436,191, which was filed on Dec. 23, 2002; U.S. patent application Ser. No. 10/027,914, which was filed on Dec. 21, 2001; U.S. Provisional Patent Application 60/437,169, which was filed on Dec. 30, 2002; and U.S. Provisional Patent Application 60/480,476, which was filed on Jun. 19, 2003. One or more embodiments of the present application may be combined or otherwise augmented by teachings in the referenced applications to yield other embodiments.

Exemplary Information-Retrieval System

Figure 1:
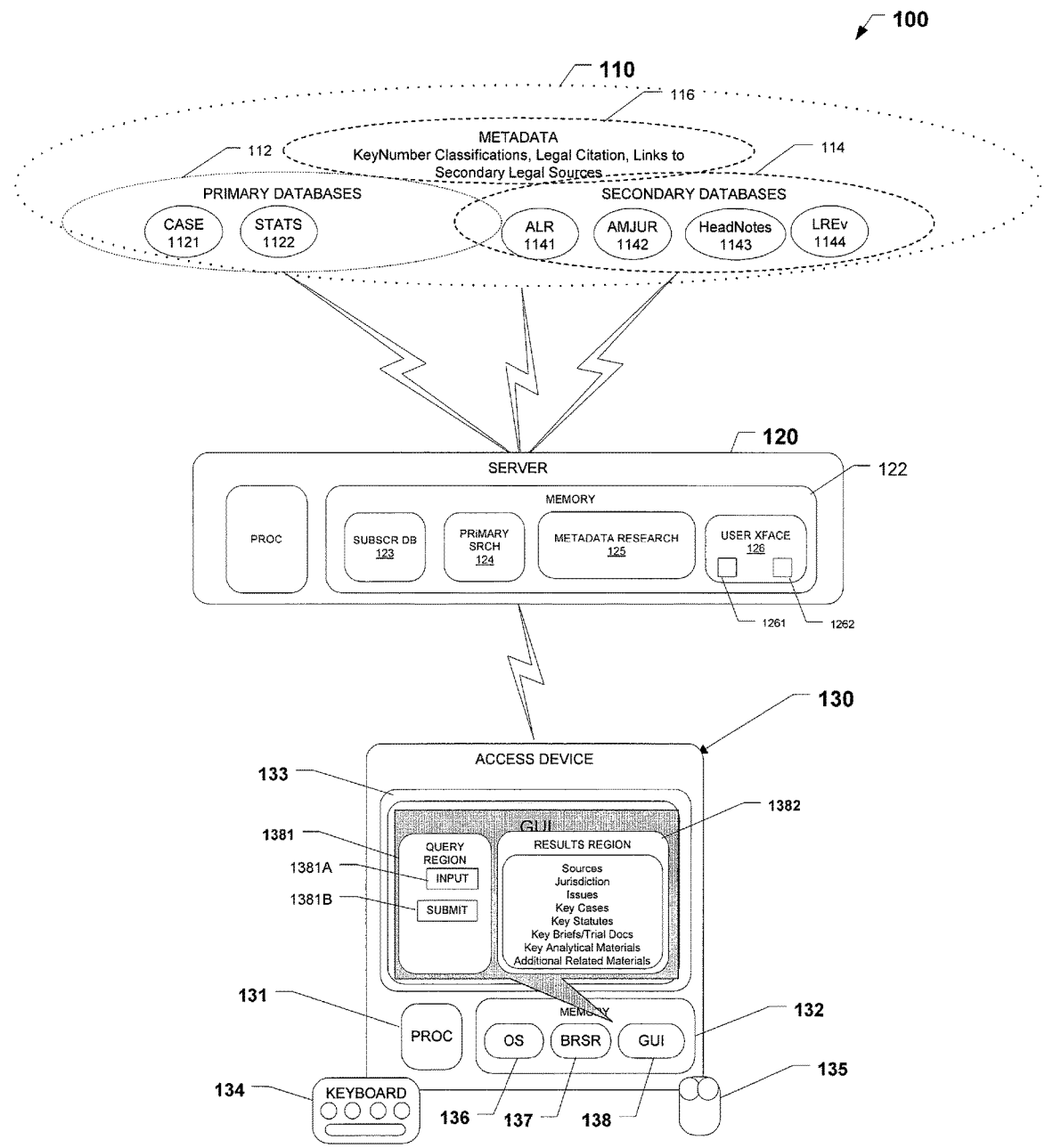
FIG. 1 is a diagram of an exemplary information-retrieval system 100 corresponding to one or more embodiments of the invention.

FIG. 1 shows an exemplary online information-retrieval (or legal research) system 100. System 100 includes one or more databases 110, one or more servers 120, and one or more access devices 130.

Databases 110 includes a set of primary databases 112, a set of secondary databases 114, and a set of metadata databases 116. Primary databases 112, in the exemplary embodiment, include a caselaw database 1121 and a statutes databases 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and an law review (LREV) database 1144. Metadata databases 116 includes case law and statutory citation relationships, KeyCite data (depth of treatment data, quotation data, headnote assignment data, and ResultsPlus secondary source recommendation data. Also, in some embodiments, primary and secondary connote the order of presentation of search results and not necessarily the authority or credibility of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, metadata research module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, secondary search module 125, and user-interface module 126.

Subscriber database 123 includes subscriber-related data for controlling, administering, and managing pay-as-you-go or subscription-based access of databases 110. In the exemplary embodiment, subscriber database 123 includes one or more preference data structures.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Metadata research module 125 includes one or more search engines for receiving and processing queries against metadata databases 116 and aggregating, scoring, and filtering, recommending, and presenting results. In the exemplary embodiment, module 125 includes one or more feature vector builders and learning machines to implement the functionality described herein. Some embodiments charge a separate or additional fee for accessing documents from the second database.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Search-results region 1382 is also defined in memory and upon rendering presents a variety of types of information in response to a case law query submitted in region 1381. In the exemplary embodiment, the results region identifies one or more source case law documents (that is, one ore good cases, usually no more than five), jurisdictional information, issues information, additional key cases, key statutes, key briefs or trial documents, key analytical materials, and/or additional related materials. (See FIG. 3, which is described below, for a more specific example of a results region.) Each identified document in region 1382 is associated with one or more interactive control features, such as hyperlinks, not shown here. User selection of one or more of these control features results in retrieval and display of at least a portion of the corresponding document within a region of interface 138 (not shown in this figure.) Although FIG. 1 shows query region 1381 and results region 1382 as being simultaneously displayed, some embodiments present them at separate times.

Exemplary Operation

Figure 2:
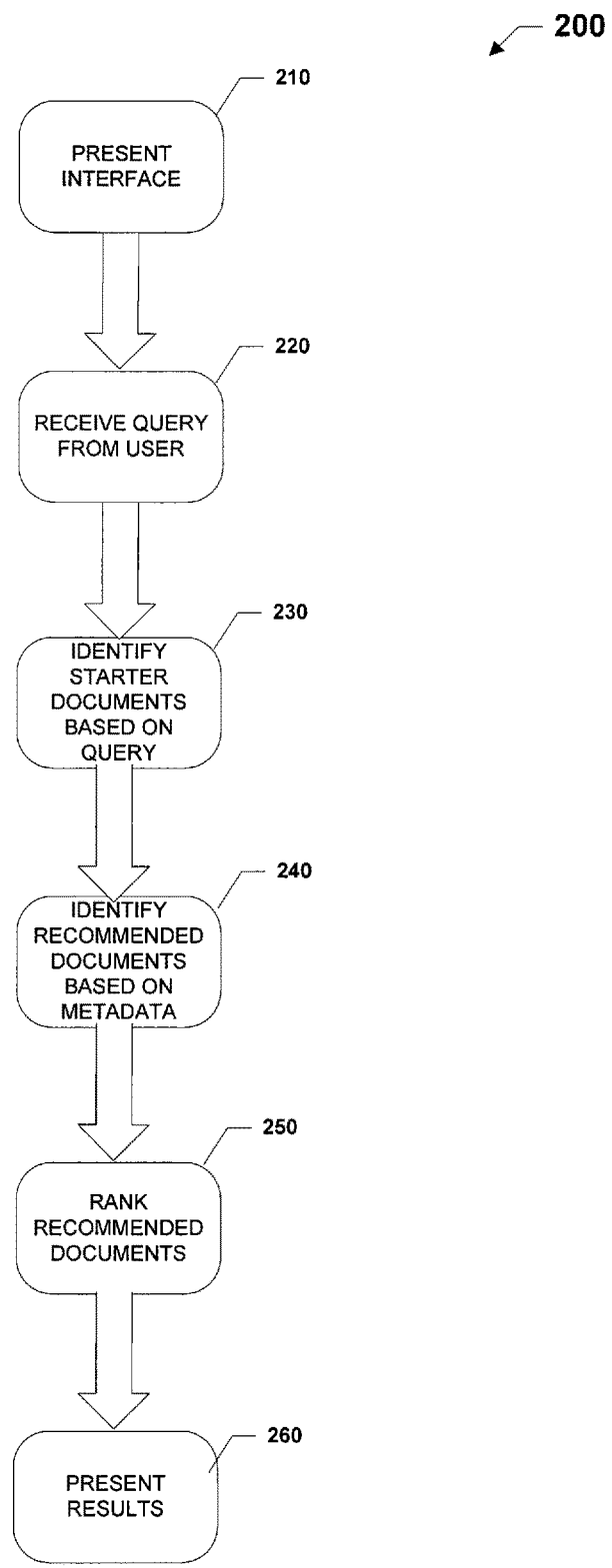
FIG. 2 is a flowchart corresponding to one or more exemplary methods of operating system 100 and one or more embodiments of the invention.

FIG. 2 shows a flow chart 200 of one or more exemplary methods of operating a system, such as system 100. Flow chart 200 includes blocks 210-250, which, like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow (in FIG. 2 and elsewhere in this description) applies to software, hardware, and firmware implementations.

Block 210 entails presenting a search interface to a user. In the exemplary embodiment, this entails a user directing a browser in an client access device to internet-protocol (IP) address for an online information-retrieval system, such as the Westlaw system and then logging onto the system. Successful login results in a web-based search interface, such as interface 138 in FIG. 1 being output from server 120, stored in memory 132, and displayed by client access device 130.

Using interface 138, the user can define or submit a case law query and cause it to be output to a server, such as server 120. In other embodiments, a query may have been defined or selected by a user to automatically execute on a scheduled or event-driven basis. In these cases, the query may already reside in memory of a server for the information-retrieval system, and thus need not be communicated to the server repeatedly. Execution then advances to block 220.

Block 220 entails receipt of a query. In the exemplary embodiment, the query includes a query string and/or a set of target databases (such as jurisdictional and/or subject matter restricted databases), which includes one or more of the select databases. In some embodiments, the query string includes a set of terms and/or connectors, and in other embodiment includes a natural-language string. Also, in some embodiments, the set of target databases is defined automatically or by default based on the form of the system or search interface. Also in some embodiments, the received query may include temporal restrictions defining whether to search secondary resources. In any case, execution continues at block 230.

Block 230 entails identifying a starter set of documents based on the received query. In the exemplary embodiment, this entails the server or components under server control or command, executing the query against the primary databases and identifying documents, such as case law documents, that satisfy the query criteria. A number of the starter set of documents, for example 2-5, based on relevance to the query are then selected as starter cases. Execution continues at block 240.

Block 240 entails identifying a larger set of recommended cases (documents) based on the starter set of cases. In the exemplary embodiment, this entails searching the metadata databases based on the citations in and to the starter cases, based on secondary legal documents that are associated with the starter cases, legal classes (West KeyNumber classifications) associated with the starter cases, and statutes query to obtain a set of relevant legal classes. In the exemplary embodiment, this larger set of recommended cases, which is identified using metadata research module 126, may include thousands of cases. In some embodiments, the set of recommended cases is based only on metadata associated with the set of starter cases (documents.)

Block 250 entails ranking the recommended cases. In the exemplary embodiment, this ranking entails defining a feature vector for each of the recommended cases (documents) and using a support vector machine (or more generally a learning machine) to determine a score for each of the documents. The support vector machine may include a linear or nonlinear kernel. Exemplary features for feature vectors include:

NumObservations—how many ways to get from source to recommendation

NumSources—how many sources (starter documents) connect to recommendation

NumReasons—how many kinds of paths to recommendation

MaxQuotations—Maximum of numQuotations value in citations

TFIDFScore—Based on text similarity of text (as used by ResultsPlus (RPD))

RPWeightedScore—Based on number of RPD recommendations shared and their scores

NumSharedRPDocs—Same as RPWeightedScore, but not based on score

KNWeightedScore—Based on the number of key numbers (legal classification codes) shared and their importance NumSharedKeyNumbers—same thing but not based on score NumSourcesCiting—Number of sources that directly cite a recommendation NumCitedSources—Number of sources cited by a recommendation NumCoCitedCases—Number of cases with co-citation between a source and a recommendation NumCoCitedByCases—Number of cases with bibilographic coupling between source and recommended documents NumSharedStatutes—Number of statutes in common SimpleKeyciteCiteCount—Raw Number of times recommended case was cited by any case Some embodiments use all these features, whereas others use various subsets of the features. Execution proceeds to block 260.

Block 260 entails presenting search results. In the exemplary embodiment, this entails displaying a listing of one or more of the top ranked recommended case law documents in results region, such as region 1382 in FIG. 1. In some embodiments, the results may also include one or more non-case law documents that share a metadata relationship with the top-ranked recommended case law documents; legal classification identifiers may also be presented. FIG. 3 shows a detailed example of this type of results presentation. Other embodiments may present a more limited result set including identifiers for the top ranked documents and a set of legal classification codes.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

The invention claimed is:

1. A system comprising:
a server for receiving a query for legal information from a user via a client access device, the server including a processor and a memory;
a primary search module adapted to receive the query from the server and for identifying a first set of documents from a first database using the query;
a metadata research module adapted to identify metadata associated with one or more of the identified first set of documents by executing the query against a plurality of additional databases comprising at least a legal classification code database, a legal headnotes database, and a secondary legal documents database;
the metadata research module further adapted to:
responsive to the identified metadata, identify by the set of search engines a set of key classification codes associated with the metadata and the identified first set of documents;
responsive to the metadata associated with one or more of the identified first set of documents and the identified set of key classification codes, automatically identify a second set of documents;
responsive to identification of the second set of documents, rank the second set of documents; and
a user interface module adapted to output a list of one or more of the ranked documents to the client access device.

2. The system of claim 1, wherein the metadata research module includes a learning machine for processing a set of feature vectors including one or more features from the group consisting of:
a feature based on text similarity;
a feature based on number of shared legal classification codes; and
a feature based on number of shared legal citations.

3. The system of claim 1, wherein each of the primary search module, the metadata research module, and the user interface module comprises a memory carrying machine-executable instructions.

4. The system of claim 3, wherein the memory comprises an electronic, magnetic, or optical medium.

5. The system of claim 1, wherein the user interface module comprises a results interface is adapted to define a graphical user interface on the client access device, with the interface including a region for displaying the list, region for displaying related trial documents, and a region for displaying one or more legal classification identifiers.

6. The system of claim 2, wherein the feature based on text similarity includes one or more from the group consisting of TFIDFScore, RPWeightedScore, and NumSharedRPDocs.

7. The system of claim 2, wherein the feature based on number of shared legal classification codes include one or more from the group consisting of KNWeightedScore and NumSharedKeyNumbers.

8. The system of claim 2, wherein the feature based on number of shared legal citations include one or more from the group consisting of NumSources, NumReasons, MaxQuotations, NumSourcesCiting, NumCitedSources, NumCoCitedCases, NumCoCitedByCases, Num SharedStatutes, and SimpleKeyciteCiteCount.

9. The system of claim 1, wherein the metadata research module further comprises one or more feature vector builders adapted to define a plurality of feature vectors, with each feature vector including a feature based on at least one from the group consisting of number of shared legal classification codes and number of shared legal citations.

10. The system of claim 1, wherein the metadata research module further comprises one or more learning machines adapted to process a plurality of feature vectors, with each feature vector including a feature based on at least one from the group consisting of number of shared legal classification codes and number of shared legal citations.

11. The system of claim 1, wherein the second set of documents includes one or more of the first set of documents.

12. The system of claim 11, wherein the metadata research module is further adapted to rank the one or more of the first set of documents.

13. The system of claim 1, wherein the metadata research module is further adapted to identify a set of legal issue related attributes derived from one or more of the group consisting of: the query; metadata from one or more of the first set of documents; and metadata about one or more of the first set of documents.

14. The system of claim 13, wherein identifying the second set of documents is based at least in part on the set of legal issue related attributes.

15. The system of claim 13, wherein ranking the second set of documents is based at least in part on the set of legal issue related attributes.

16. A method comprising:
identifying a first set of documents from a first database using a query for legal information;
automatically identifying metadata associated with one or more of the identified first set of documents by executing the query against a plurality of additional databases comprising at least a legal classification code database, a legal headnotes database, and a secondary legal documents database;
automatically identifying, based on the identified metadata, a set of key classification codes associated with the metadata and the identified first set of documents;
automatically identifying a second set of two or more documents based on the metadata associated with one or more of the identified first set of documents and the identified set of key classification codes;
automatically ranking the second set of documents based at least in part on identification of the second set of documents; and
automatically outputting a list of one or more of the ranked documents to a client access device.

17. The method of claim 16, wherein the ranking the second set of documents includes using a learning machine to process a set of feature vectors including one or more features from the group consisting of:
a feature based on text similarity;
a feature based on number of shared legal classification codes; and
a feature based on number of shared legal citations.

18. The method of claim 16, wherein outputting the list of one or more of the ranked documents include defining a graphical user interface on the client access device, with the interface including a region for displaying the list, region for displaying related trial documents, and a region for displaying one or more legal classification identifiers.

19. The method of claim 16, wherein the ranking the second set of documents includes using a learning machine to process a plurality of feature vectors, with each feature vector including a feature based on at least one from the group consisting of number of shared legal classification codes and number of shared legal citations.

20. The method of claim 16, wherein the ranking the second set of documents includes using a learning machine to process a plurality of feature vectors, with each feature vector including a feature based on number of shared legal citations.

21. The method of claim 16, wherein the ranking the second set of documents includes defining a plurality of feature vectors, with each feature vector including a feature based on at least one from the group consisting of number of shared legal classification codes and number of shared legal citations.

22. The method of claim 16, wherein the ranking the second set of documents includes defining a plurality of feature vectors, with each feature vector including a feature based on number of shared legal citations.

23. The method of claim 17, wherein the feature based on text similarity include one or more from the group consisting of TFIDF Score, RPWeightedScore, and Num SharedRP-Docs.

24. The method of claim 17, wherein the feature based on number of shared legal classification codes include one or more from the group consisting of KNWeightedScore and NumSharedKeyNumbers.

25. The method of claim 17, wherein the feature based on number of shared legal citations include one or more from the group consisting of NumSources, NumReasons, MaxQuotations, NumSourcesCiting, NumCitedSources, NumCoCitedCases, NumCoCitedByCases, Num SharedStatutes, and SimpleKeyciteCiteCount.

26. The method of claim 16, wherein the second set of documents includes one or more of the first set of documents.

27. The method of claim 26, wherein automatically ranking the second set of documents includes automatically ranking the one or more of the first set of documents.

28. The method of claim 16, wherein automatically identifying a second set of documents includes automatically identifying a set of legal issue related attributes derived from one or more of the group consisting of: the query; metadata from one or more of the first set of documents; and metadata about one or more of the first set of documents.

29. The method of claim 28, wherein automatically identifying the second set of documents is based at least in part on the set of legal issue related attributes.

30. The method of claim 28, wherein automatically ranking the second set of documents is based at least in part on the set of legal issue related attributes.

31. A non-transitory machine-readable medium comprising instructions for causing a server:
to receive a query for legal information from a user via a client access device;
to identify a first set of documents from a first database using the query;
to automatically identify metadata associated with one or more of the identified first set of documents by executing the query against a plurality of additional databases comprising at least a legal classification code database, a legal headnotes database, and a secondary legal documents database;
to automatically identify, based on the identified metadata, a set of key classification codes associated with the metadata and the identified first set of documents;
to automatically identify a second set of documents based on the metadata associated with one or more of the identified first set of documents and the identified set of key classification codes;
to rank the second set of identified documents based at least in part on identification of the second set of documents; and
to output a list of one or more of the ranked documents to the client access device.

32. The machine-readable medium of claim 31, further comprising instructions for causing the server to process a set of feature vectors including at least one from the group consisting of:
a feature based on text similarity;
a feature based on number of shared legal classification codes; and
a feature based on number of shared legal citations.

33. The machine-readable medium of claim 31, further comprising instructions for causing the server to define a graphical user interface on the client access device, with the interface including a region for displaying the list, region for displaying related trial documents, and a region for displaying one or more legal classification identifiers.

34. The machine-readable medium of claim 31, wherein the instructions to rank comprise instructions to use a learning machine to process a plurality of feature vectors, with each feature vector including a feature from the group consisting of number of shared legal classification codes and number of shared legal citations.

35. The machine-readable medium of claim 31, wherein the instructions to rank comprise instructions to define a plurality of feature vectors, with each feature vector including a feature from the group consisting of number of shared legal classification codes and number of shared legal citations.

36. The machine-readable medium of claim 31, wherein the feature based on text similarity include one or more from the group consisting of TFIDF Score, RPWeightedScore, and NumSharedRPDocs.

37. The machine-readable medium of claim 31, wherein the feature based on number of shared legal classification codes include one or more from the group consisting of KNWeightedScore and Num SharedKeyNumbers.

38. The machine-readable medium of claim 31, wherein the feature based on number of shared legal citations include one or more from the group consisting of NumSources, NumReasons, MaxQuotations, NumSourcesCiting, NumCitedSources, NumCoCitedCases, NumCoCitedByCases, Num SharedStatutes, and SimpleKeyciteCiteCount.

39. The machine-readable medium of claim 31, wherein the second set of documents includes one or more of the first set of documents.

40. The machine-readable medium of claim 39, wherein instructions to cause the server to rank the second set of documents includes instructions to cause the server to rank the one or more of the first set of documents.

41. The machine-readable medium of claim 31 further comprising instructions to cause the server to identify a set of legal issue related attributes derived from one or more of the group consisting of: the query; metadata from one or more of the first set of documents; and metadata about one or more of the first set of documents.

42. The machine-readable medium of claim 41, wherein identifying the second set of documents is based at least in part on the set of legal issue related attributes.

43. The machine-readable medium of claim 41, wherein ranking the second set of documents is based at least in part on the set of legal issue related attributes.

* * * * *